United States Patent
Wright et al.

(10) Patent No.: US 6,467,042 B1
(45) Date of Patent: Oct. 15, 2002

(54) METHOD AND/OR APPARATUS FOR LOWERING POWER CONSUMPTION IN A PERIPHERAL DEVICE

(75) Inventors: David G. Wright, Woodinville; Timothy J. Williams, Bellevue, both of WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 09/750,608

(22) Filed: Dec. 27, 2000

(51) Int. Cl.$^7$ ................................................. G06F 1/00
(52) U.S. Cl. ...................... 713/320; 713/323; 713/324; 713/322
(58) Field of Search ................... 713/310, 320, 713/323–324, 300; 710/62–64, 72

(56) References Cited

U.S. PATENT DOCUMENTS

| | | | | |
|---|---|---|---|---|
| 5,799,196 A | * | 8/1998 | Flannery | 713/320 |
| 5,903,746 A | * | 5/1999 | Swoboda et al. | 713/501 |
| 6,085,325 A | * | 7/2000 | Jackson et al. | 713/300 |
| 6,122,749 A | * | 9/2000 | Gulick | 713/324 |
| 6,128,743 A | * | 10/2000 | Rothenbaum | 713/300 |
| 6,191,660 B1 | | 2/2001 | Mar et al. | 331/111 |
| 6,212,641 B1 | * | 4/2001 | Frank et al. | 713/323 |
| 6,272,644 B1 | * | 8/2001 | Urade et al. | 713/320 |

OTHER PUBLICATIONS

Timothy J. Williams, "Circuit and Method for Providing a Precise Clock", U.S. Ser. No. 09/668,801, Filed Sep. 22, 2000.
Timothy J. Williams et al., "Auto–Locking Oscillator for Data Communications", U.S. Ser. No. 09/511,019, Filed Feb. 23, 2000.
Timothy J. Williams et al., "Circuit for Locking an Oscillator to a Data Stream", U.S. Ser. No. 09/511,020, Filed Feb. 23, 2000.
"Universal Ser. Bus Specification", Revision 1.1, Sep. 23, 1998, pp. 1–311.
"Universal Ser. Bus Specification", Rev. 2.0, Apr. 27, 2000, pp. 1–622.

* cited by examiner

Primary Examiner—Peter Wong
Assistant Examiner—Raymond N Phan
(74) Attorney, Agent, or Firm—Christopher P. Maiorana, P.C.

(57) ABSTRACT

A method for lowering power consumption of a Universal Serial Bus (USB) device, comprising the steps of (A) detecting a frame comprising one or more indicators from an input data stream and (B) waking the USB device or continually operating in a suspend/sleep mode, in response to the one or more indicators.

14 Claims, 5 Drawing Sheets

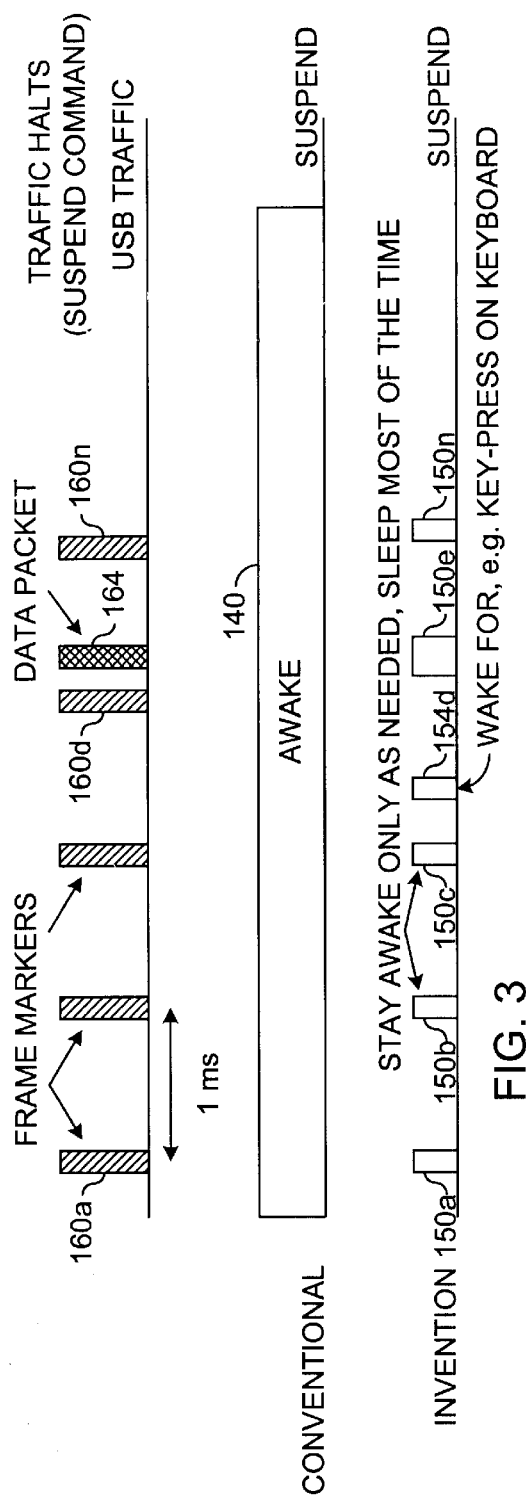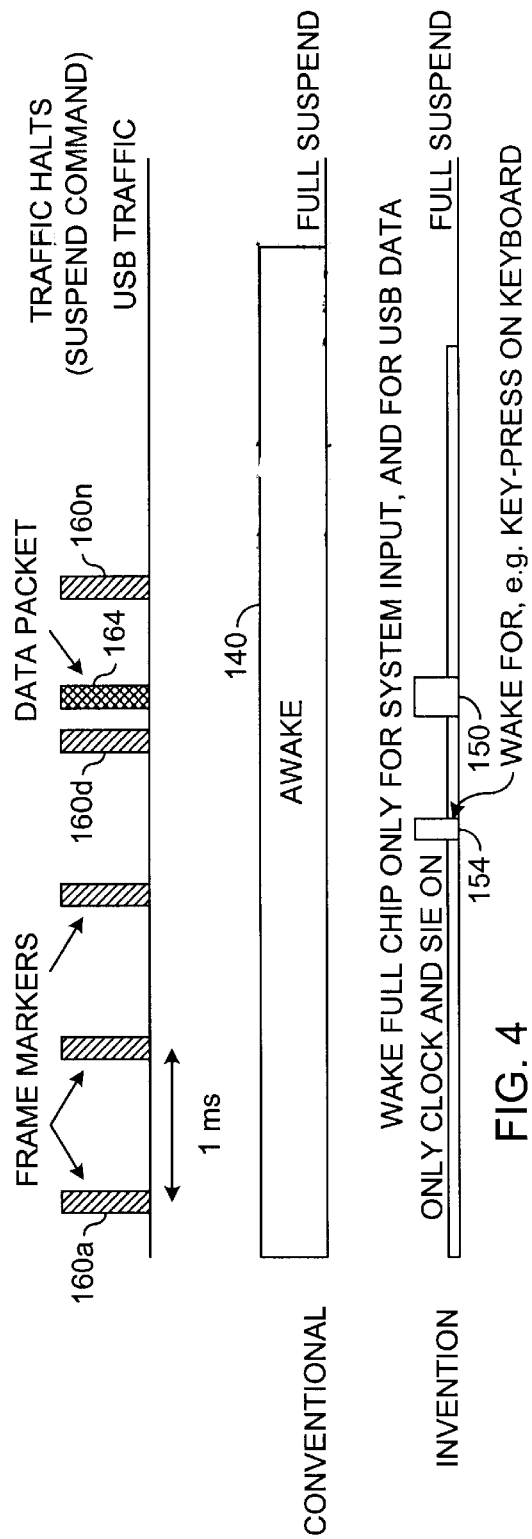

METHOD AND/OR APPARATUS FOR LOWERING POWER CONSUMPTION IN A PERIPHERAL DEVICE

FIELD OF THE INVENTION

The present invention relates to a method, architecture and/or software for implementing peripheral devices generally and, more particularly, to a method, architecture and/or software for implementing Universal Serial Bus (USB) devices that consume a minimum amount of power.

BACKGROUND OF THE INVENTION

When implementing modern computer devices, in particular peripheral devices, it is generally desirable to provide low power consumption in the devices. Achieving a low power consumption during normal operating modes is typically a function of hardware. For example, through software control, specific hardware components of a particular device may be selected to be turned off to lower power consumption in suspend or sleep modes. However, it is often difficult to reach aggressive low power targets.

USB devices (which typically have current consumption of 10–100 mA) implement a low power suspend mode in which device current drops to 0–0.5 mA. The suspend mode is normally only entered on a system command (i.e., a suspend indication signal). Additionally, extensive use of the suspend mode can cause the USB device to miss USB traffic.

USB microcontrollers are continuously running (i.e., on) during normal operation, since USB traffic is constantly received (i.e., traffic is received on each frame at 1 ms intervals). The microcontroller remains on, with clocks running, in order to immediately respond to any received USB traffic. Thus, conventional USB microcontrollers are either off (i.e., for a low-power state as directed by a host) or completely on during normal operation. The disadvantage of such an architecture is that full power consumption is required at all times during normal operation. In power sensitive applications, such as battery powered devices, meeting power consumption targets is a difficult challenge for USB devices.

SUMMARY OF THE INVENTION

The present invention concerns a method for lowering power consumption of a Universal Serial Bus (USB) device, comprising the steps of (A) detecting a frame comprising one or more indicators from an input data stream and (B) waking the USB device or continually operating in a suspend/sleep mode, in response to the one or more indicators.

The objects, features and advantages of the present invention include providing a method and/or architecture for implementing low power devices, such as USB devices, that may (i) use suspend/sleep modes during a majority of operation, (ii) remain in a suspend state for over 90% of active time for many applications, (iii) achieve significant power savings if switching wake-up/shut-down time is quick, (iv) allow use of suspend mode during typically non-suspend times, (v) provide continual return to suspend condition, (vi) wake to service environmental changes, including USB traffic, (vii) allow operation of a serial interface engine (SIE) while a processor is halted for a USB microcontroller, (viii) avoid losing traffic while the SIE is running, (ix) provide power savings in the USB microcontroller by suspending the processor portion when not performing useful tasks, and/or (x) provide an architecture for a data communication microcontroller that may allow the USB microcontroller to remain in an off state of operation during a majority of time.

BRIEF DESCRIPTION OF THE DRAWINGS

These and other objects, features and advantages of the present invention will be apparent from the following detailed description and the appended claims and drawings in which:

FIG. 3 is a timing diagram illustrating an operation of one aspect of the present invention compared with a conventional approach;

FIG. 4 is a timing diagram illustrating an operation of one aspect of the present invention compared with a conventional approach;

DETAILED DESCRIPTION OF THE PREFERRED EMBODIMENTS

To reduce power consumption, a device can be suspended in a lower power mode during a majority of operation time such that average power consumption drops dramatically. While in the suspend mode for a typical part, a clock generator circuit is turned off, a microcontroller is halted, and almost all other circuits are disabled.. However, circuits which are required for detecting wake-up conditions (e.g., relevant data) remain on.

The lowest power class for normal operation in the original USB specifications (e.g., the USB specification version 1.0 (published November 1996), the USB specification version 1.1 (published September 1998), and/or the USB specification version 2.0 (published April 2000), each of which are hereby incorporated by reference in their entirety) is a current of 100 mA and a voltage level of 5 V. However, the extension of USB into battery powered (or portable) applications, is driving a need for ever lower power consumption in USB peripheral devices.

Figure 1:
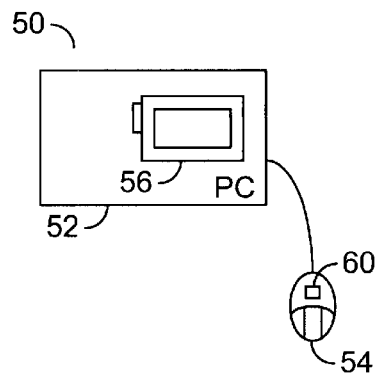
FIG. 1 is a block diagram illustrating an example implementation of the present invention.

Referring to FIG. 1, a block diagram of a system 50 is shown in accordance with a preferred embodiment of the present invention. The system 50 generally comprises a computer (e.g., a personal computer (PC)) 52 and a peripheral device 54. In one example, the peripheral device 54 may be implemented as a Universal Serial Bus (USB) peripheral device. The system 50 may provide a low power mode of operation. The computer 52 may include an interface 56. In one example, the interface 56 may be implemented as a USB interface. The peripheral device 54 may comprise a microprocessor block (or circuit) 60. In one example, the circuit 60 may be implemented as a low power consumption microprocessor circuit. The circuit 60 may interface with the host device 52 (via the interface 56).

It is generally desirable to provide lower power USB devices, particularly in battery powered applications. For example, it may be beneficial for low power USB devices to use only 4 mA of current (or less), for a maximum long term current average.

The requirements of the system 50 may reduce the allowed current consumption limit of the USB peripheral device 54 to previously unachievable levels. Thus, the present invention may provide a micropower USB device (e.g., the peripheral device 54) that uses a fraction of the power of conventional devices. For example, a keyboard that typically requires 20 mA of current may be reduced to 2 mA (or less) of current with the system 50.

Figure 2:
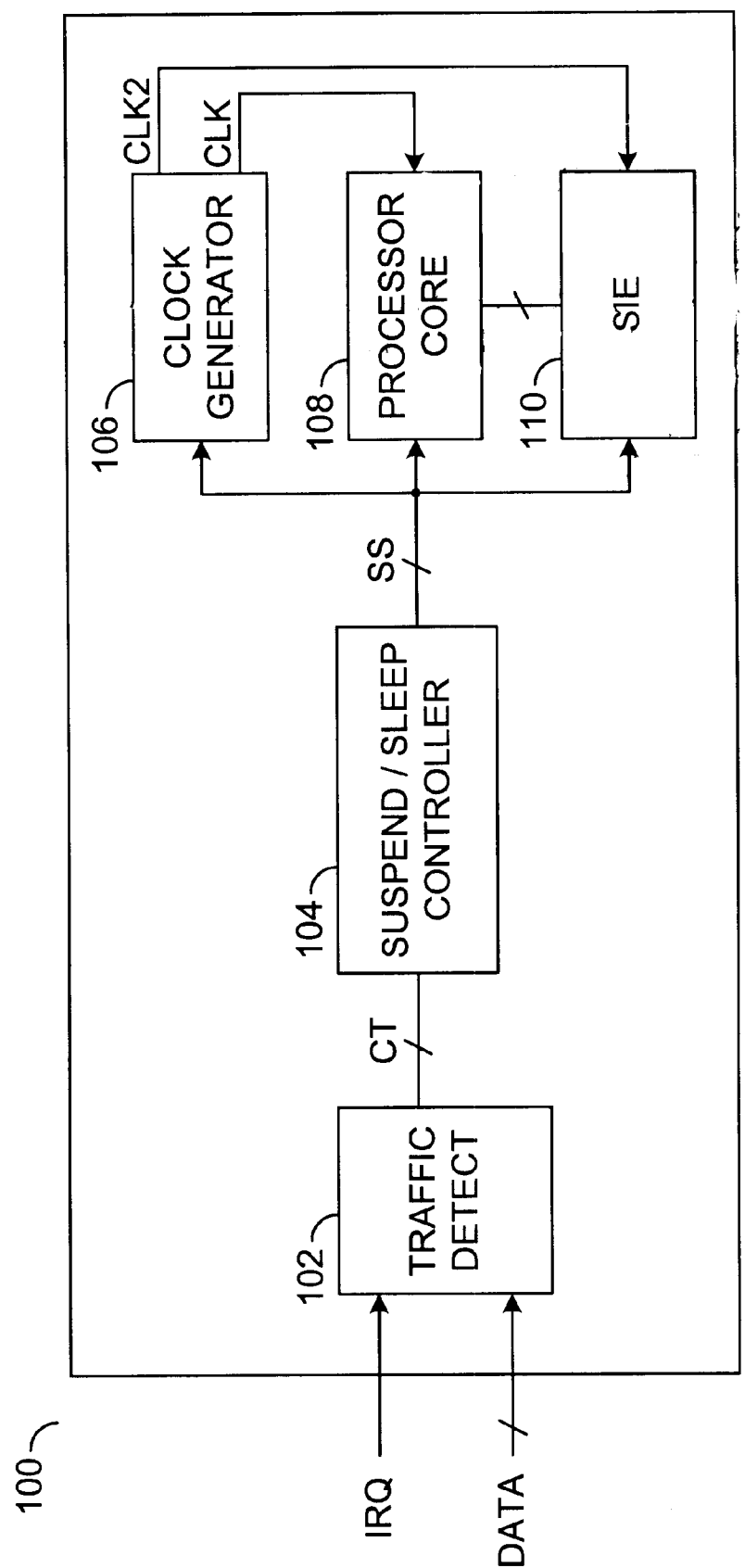
FIG. 2 is a detailed block diagram of the present invention.

Referring to FIG. 2, a diagram of a circuit 100 illustrating an implementation of the present invention is shown. The circuit 100 generally comprises a circuit 102, a circuit 104, a circuit 106, a circuit 108 and a circuit 110. The circuit 102 may be implemented as a traffic detect circuit. The circuit 104 may be implemented as a suspend/sleep controller circuit. The circuit 106 may be implemented as a clock generator circuit. The circuit 108 may be implemented as a processor core circuit. The circuit 110 may be implemented as a USB serial interface engine (SIE).

The circuit 104 may generate a control signal (e.g., SS) that may be used to control the sleep/suspend state of the circuits 106, 108 and 110, in response to a control signal (e.g., CT) received from the traffic detect circuit 102. The traffic detect circuit 102 generates the signal CT in response to data (or a non-idle state) received on a signal (e.g., DATA). The traffic detect circuit 102 may also receive a signal (e.g., IRQ).

The clock generator 106 may generate a signal (e.g., CLK) and a signal (e.g., CLK2) that may be used to clock the circuit 100. However, the signal CLK is generally only presented to the processor 108 and the signal CLK2 is generally only presented to the SIE 110. The signals CLK and CLK2 may have the same or different frequency and/or phase.

Alternatively an external USB SIE (not shown) may be implemented to interface with the microcontroller 100. However, the external USB SIE may have reduced integration, with associated higher costs and power consumption.

Referring to FIG. 3, a timing diagram of the operation (or embodiment) of the circuit 100 is shown compared with a conventional approach. The conventional approach, labeled "CONVENTIONAL" is shown always operating in an awake state or a suspend state. An awake time 140 comprises a majority of the conventional "CONVENTIONAL" operation time. The suspend state may be entered in response to a system command or indication (e.g., all USB activity halts for >3 ms).

The present invention, labeled "INVENTION" is shown operating in the awake state only during a limited number of times labeled 150a–150n and 154. The times 150a–150n may occur for short intervals. Since the awake times 150a–n are significantly less than the awake time 140, the circuit 100 uses less power than the conventional approaches described in the background section. A number of frame markers 160a–160n are shown in the USB traffic at periodic times. A data packet 164 is shown between the frame marker 160d and the frame marker 160n. Since the data packet 164 occurs, a duration of the awake period 150e is slightly longer than the other awake periods 150a–150n and 154. A non-USB wake-up (e.g., a keyboard button press) may also bring the device out of suspend mode, as shown by the awake time 154 between the USB events 150c and 150e.

USB traffic is typically broken into 1 ms frames. Each 1 ms frame contains one of the frame markers 160a–160n. The frame marker 160a–160n may be implemented as either a start-of-frame indication (e.g., for full speed mode) or a keep-alive indication (e.g., for low speed mode). However, other type indications may be implemented to meet the criteria of a particular implementation. In a typical application, especially for low speed mode, signaling generally occurs only during a small fraction of the total operation time. For example, a low speed device may receive the frame marker packet each frame for a majority of frames and may only receive normal traffic every 8 or 10 frames of activity. Thus, the actual data traffic that needs to be processed by the device 54 occurs a very low percentage of time.

The embodiment of FIG. 3 may insert sleep/suspend states after each packet has been processed without losing any data. If the oscillator 106 wakes up fast enough, the microcontroller 100 may immediately return to the suspend state after every marker, since the device could re-wake-up during subsequent traffic.

The embodiment of FIG. 3 may allow a device to be in the suspend mode during almost all periods when there is no traffic on the bus, even during normal (non-suspend) USB operating mode. For example, the embodiment of FIG. 3 may allow the device 54 to remain awake after the marker is received, for a predetermined period of time. The device 54 may then determine if there is any relevant data occurring during the frame. When any traffic (including the marker) is received, the device wakes up, processes the traffic, and returns to the suspend mode.

Referring to FIG. 4, a timing diagram illustrating an alternate operation (or embodiment) of the circuit 100 is shown, also compared to the conventional approach discussed in the background section. The awake times 150 and 154 are shown only occurring when USB data has been received or an interrupt (e.g., a keyboard key process) is received, respectively. When the awake times are not present, only the clock and the serial interface engine need to be operational. As a result, the circuit 100 may provide a significant power savings.

The embodiment of FIG. 4 may allow a majority of the hardware of the microcontroller 60 or 100 to be turned off for prolonged periods during normal operation. In the embodiment of FIG. 4, the USB SIE 110 may be constantly enabled and powered. In addition, the clock generator circuit 106 may also be constantly enabled and powered to provide the clock signal CLK2 to the SIE 110. The SIE 110 would then provide an interrupt signal to wake the processor 108 on relevant USB traffic.

In a typical application (where the embodiment of FIG. 4 may be implemented), a significant amount of USB traffic (e.g., frame markers and traffic directed to other devices) requires no response from a given device. Thus, the microcontroller 100 may be switched off and not powered for such traffic. The SIE 110 may be required to stay on consuming only a small fraction of the power within the USB microcontroller 100. The circuit 100 may provide a dramatic reduction in overall power consumption. The circuit 100 may substantially lower power consumption and extend battery life for USB enabled portable devices. If the microcontroller 100 is implemented with a very first starting oscillation further power savings may be achieved by allowing the processor core 108 to remain off until needed.

The embodiment of FIG. 4 may selectively power off all of the USB microcontroller 100 (or 60), except for the traffic detect circuit 102 and SIE 110, during normal operation. Additionally, the sleep/suspend controller 104 may not be powered off. The USB protocol engine (e.g., the SIE 110) may be kept awake to catch all relevant USB traffic. For example, the circuit 100 may wake the processor core 108 on relevant data traffic. The circuit 100 may keep the core asleep during typical housekeeping-type signaling, such as frame markers. However, other environmental inputs can be used to wake the microcontroller 100 (or 60) as well. The circuit 100 may provide significant power savings since only the clock generating oscillator and other limited logic circuitry are fully operational. The embodiment in accordance with FIG. 4 may be widely implemented in accordance with the design specifications of low power portable devices.

With respect to the embodiments of FIGS. 3 and 4, a relevant data determination may occur during the first several microseconds after the keep-alive marker is received for low speed applications of USB devices. If no relevant data is received, the device 54 may return to suspend mode. If additional traffic or data is received, the device 54 may remain awake until the traffic has been processed, and then return to the suspend mode, as shown at the event 164. In addition, the device 54 may wake up in response to other inputs (e.g., input key press 154 on a keyboard) via the signal IRQ.

The present invention may require a fast start-up precision oscillator (e.g., the clock generation circuit 106). For conventional oscillators, the wake-up and stabilization period is on the order of hundreds of microseconds (or more). By implementing a fast start-up oscillator that does not require a crystal or resonator (e.g., U.S. Ser. No. 09/668,801, filed Sep. 22, 2000, U.S. Ser. No. 09/275,336, filed Mar. 24, 1999, U.S. Ser. No. 09/511,019, filed Feb. 23, 2000 and U.S. Ser. No. 09/511,020, filed Feb. 23, 2000, which are each hereby incorporated by reference in their entirety), the microcontroller 108 may incorporate and enable the preferred techniques of the present invention. This may enable the processor core 108 and the SIE 110 to wake quickly enough to properly process USB traffic. By remaining in suspend mode 90% (or more) of the time, overall power consumption for a typical device may be dropped to 1–2 mA.

In general, the present invention returns to the suspend mode whenever practical during normal USB operation. The present invention may provide a low power consumption solution. The present invention may implement suspend/sleep modes during most of normal operating times (e.g., over 90% of active time for many applications). Additionally, if a wake-up/shut-down time of the clock generation circuit 106 is fast enough, the present invention may achieve significant increased power savings. The present invention may make use of the suspend mode during typically non-suspend times (e.g., after each data packet) and continually return to the suspend condition. The present invention may wake only to service environmental changes, including USB or other activity (e.g., keyboard key press). However, the embodiment of the present invention illustrated in FIG. 3 generally should wake up every 1 ms for USB traffic.

Figure 5:
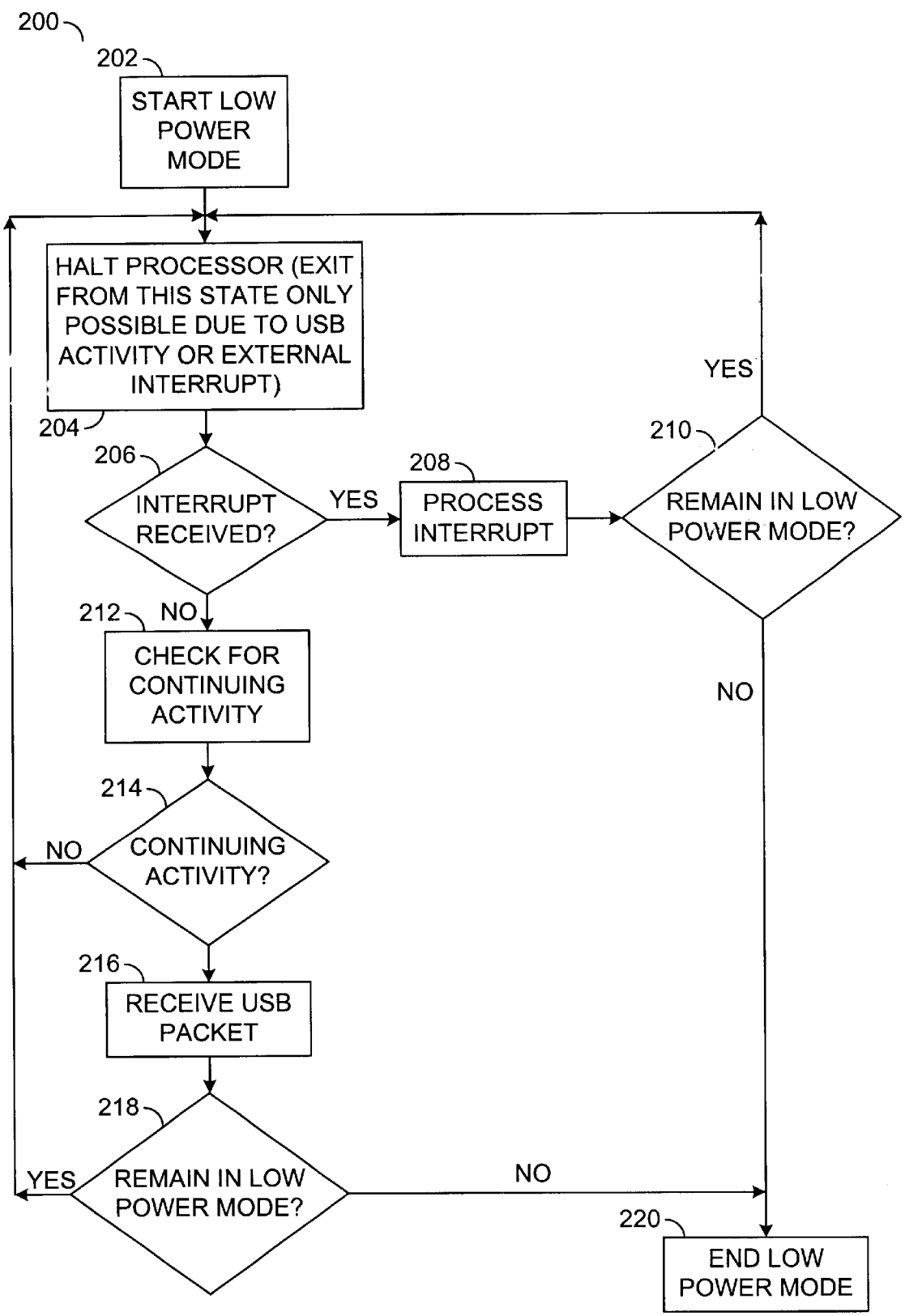
FIG. 5 is a flow chart illustrating an operation of the present invention.

Referring to FIG. 5, a process (or method) 200 is shown. The process 200 may provide a micropower USB device power down method for the present invention. The process 200 may be implemented to continually halt the processor core 108. The process 200 generally comprises a start state 202, a state 204, a decision state 206, a state 208, a decision state 210, a state 212, a decision state 214, a state 216, a decision state 218 and an end state 220. The state 204 may halt the processor. The process 200 may spend a majority of time at the state 204. Thus, the processor core 108 is constantly in the suspend mode. The process 200 is generally only exited when USB activity is detected or an external interrupt is detected. The process 200 may continue to the state 206 if exited.

Next, the process 200 may continue to the state 206. The process 200 may then determine if an interrupt is received. If an interrupt is received, the process 200 may service the interrupt and move to the state 210. The process 200 may then determine if the system should remain in low power mode. If the system should remain in low power mode, the method 200 returns to the state 204. The state 204 may again cause the process 200 to halt the processor core 108. If the system should not remain in low power mode, the method 200 may continue to the state 220. Referring back to the decision state 206, if an interrupt is not received, the process 200 may check for continuing activity. If continuing activity is not received, the process 200 may return to the state 204. The state 204 may again cause the process 200 to halt the processor core 108. If continuing activity has been received, the process 200 may continue to receive the USB packet.

Next, the method 200 may continue to the decision state 218. The process 200 may then determine if the system should remain in the low power mode. If the system should remain in low power mode, the method 200 may return to the state 204. If the system should not remain in low power mode, the method 200 may continue to the state 220. It can be seen that the process 200 spends a majority of time at the state 204, which halts the processor core 108 and saves power in the circuit 100.

The process 200 may rely on USB traffic to be received at a start of the frame (e.g., the USB low speed keep alive marker (or pulse) that occurs at a start of each frame). The keep alive marker at a start of each frame generally allows the processor core 108 to be waken in time to receive the following USB data packet. The USB data packet may follow directly after the keep alive marker within the same frame. The overall average power consumption of the circuit 100 will be determined almost entirely by the amount of time spent in external interrupt service routines (not at the state 204). The power consumption of the USB microcontroller 100 may be negligible when halted in the suspend mode (at the state 204).

Low speed USB applications only require 5% of a frame to allow a low speed USB transaction. Additionally, during normal operation a low speed device may only be interfaced occasionally (e.g., once every 8th or 10th frame). Therefore, in order to process a transaction appearing at the start of every interfaced frame (e.g., every 8th or 10th frame), the microcontroller 100 may only need to be active for approximately 0.5% of the time.

Figure 6:
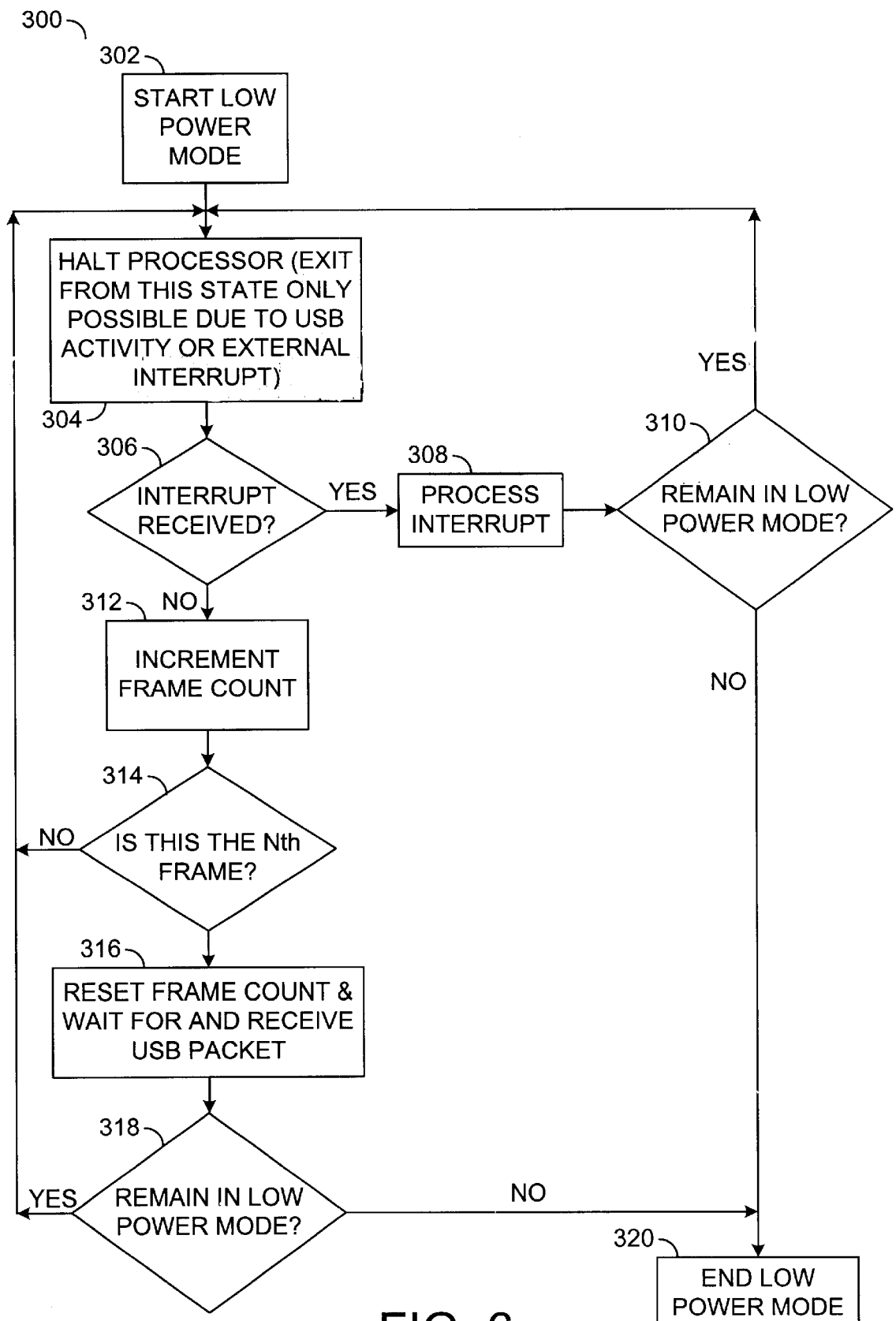
FIG. 6 is a flow chart illustrating an operation of another aspect of the present invention.

Referring to FIG. 6, a process (or method) 300 is shown in accordance with an alternate embodiment of the present invention. The process 300 may provide an alternate micropower USB device power down method that may be used separately or in combination with the process 200. The process 300 may be implemented to continually halt the processor core 108. The method 300 generally comprises a state 302, a state 304, a decision state 306, a state 308, a decision state 310, a state 312, a decision state 314, a state 316, a decision state 318 and a state 320. At the state 302, the process 300 may start in the low power mode. Next, process 300 may continue to the state 304. The process 300 may then halt the processor core 108. The process 300 is only exited when an interrupt is received or when USB activity is detected. The process 300 may spend a majority of time at the state 304 with the processor core 108 halted.

Next, the process 300 may continue to the decision state 306. The process 300 may then determine if an interrupt has been received. If an interrupt has been received, the method 300 may process the interrupt and move to the state 310. The process 300 may determine if the system should remain in the low power mode. If the system should remain in low power mode, the method 300 may return to the state 304. If the system does not need to remain in low power mode, the method 300 may continue to the state 320. Referring back to the decision state 306, if an interrupt has not been received, the process 300 may increment a frame count. Next, the process 300 may continue to the decision state 314. The process 300 may then determine if the frame count is the Nth frame. If the frame count is the Nth frame, the method 300 may move to the state 316. If the frame count is not the Nth frame, the method 300 may return to the state 304. The process 300 may then reset the frame count and wait for a received USB packet.

Next, the process 300 may continue to the decision state 318. The process 300 may then determine if the system should remain in low power mode. If the system should remain in low power mode, the method 300 may return to the state 304. If the system does not need to remain in low power mode, the method 300 may continue to the state 320.

In some cases, USB traffic may not always occur at the start of the frame. The method 300 may be effectively implemented to process such USB traffic variations. In general, all low speed transfers are scheduled. Although it may not be possible to know when in a frame the transaction will be scheduled, it is possible to know in which frame the transaction will occur.

Low speed devices are generally not permitted to request to be "polled" by a host more often than once every 10th frame. However, some hosts (for reason of scheduling ease) only poll low speed devices with a frequency that is a power of 2 frames. Therefore, by both criteria, a low speed device that requests to be polled every 16th frame can be reliably polled. The process 300 describes such an approach, where N is the frequency with which the low speed device is to be polled by the host. For example, if on average a USB transaction will occur in the middle of a frame, then using the process 300 where N=16, the processor core 108 may be active for a little over 3% (e.g., 1/32) of the time waiting for USB traffic to be received.

Figure 7:
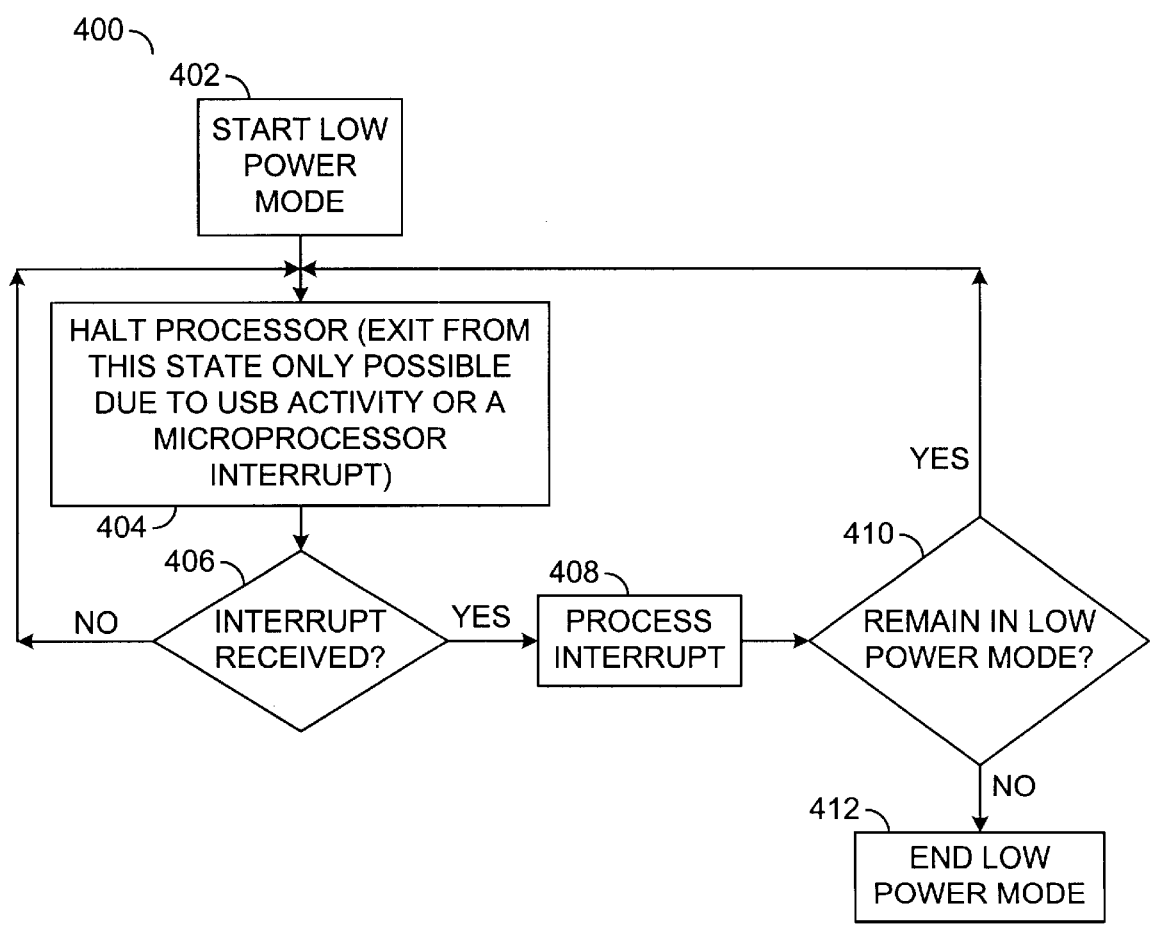
FIG. 7 is a flow chart illustrating an operation of another aspect of the present invention.

Referring to FIG. 7, a process (or method) 400 is shown. The process 400 may illustrate a simple micropower USB microcontroller power down method. While the process 400 may be less complex when compared to the method 200 and the method 300, the process 400 may be implemented to continually halt the processor core 108. The process 400 generally comprises a start state 402, a state 404, a decision state 406, a state 408, a decision state 410 and a state 412. A state 402 may cause the process 400 may start in a low power mode. The process 400 may then continue to the state 404. The state 404 may cause the process 400 to halt the processor core 108. The process 400 may then only continue to the state 406 if USB traffic activity or an interrupt signal is detected. The process 400 may then determine if an interrupt signal is received. If an interrupt signal is not received, the process 400 may loop back to the halt processor state 404. The state 404 may cause the process 400 to again halt the processor core 108. If an interrupt signal is received, the process 400 may continue to the state 408. The process 400 may then process the interrupt signal. The process 400 may then continue to the decision state 410. The process 400 may then determine whether to remain in a low power mode. If remaining in a low power mode, the process 400 may return to the halt processor state 404. If not remaining in the low power mode, the process 400 may continue to the state 412 to end the low power mode operation.

The process 400 may allow the USB serial interface engine 110 to remain fully active while the rest of the microcontroller 100 is halted via the sleep/suspend controller 104. Incoming USB traffic may be processed once received by the SIE 110. Upon reception of data, the SIE 100 may cause an interrupt, which may wake the remaining circuits of the microcontroller 100 from the suspend state. The process 400 may have a less dramatic power reducing effect than the process 200 or the process 300 since the SIE 110 is continually consuming power. However, since the microcontroller 100 is mostly halted, only a negligible current may be drawn. Also, the microcontroller core 108 does not wake on frame markers. The particular amount of current reduction provided by the process 400 may depend on the details of the particular application.

The processes 200, 300 and/or 400 may be implemented in battery powered (or self-powered) applications to extend battery life. The processes 200, 300 and 400 may be particularly useful in a low a speed USB device. However, the processes 200, 300 and 400 may also be applicable to low, full and high speed USB devices. However, the current required to drive a full or high speed transceiver is generally too high to meet low power consumption requirements desired for battery powered applications.

The function performed by the flow diagrams of FIGS. 5, 6 and 7 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

What is claimed is:

1. A method for lowering power consumption of a Universal Serial Bus (USB) device, comprising the steps of:

(A) detecting a frame comprising one or more indicators from an input data stream;

(B) waking said USB device or continually operating in a suspend/sleep mode, in response to said one or more indicators;

(C) starting an oscillator within a predetermined interval;

(D) clocking a microcontroller with said oscillator;

(E) controlling said suspend/sleep mode of said microcontroller with a serial interface engine; and (F) halting said microcontroller during said suspend/sleep mode.

2. The method according to claim 1, wherein at least one of said one or more indicators comprise a wake-up marker.

3. The method according to claim 1, wherein at least one of said one or more indicators comprise an external event.

4. The method according to claim 1, wherein at least one of said one or more indicators is configured to wake a portion of said USB device for a predetermined time period.

5. The method according to claim 1, wherein at least one of said one or more indicators indicate a relevant data packet.

6. The method according to claim 1, wherein step (B) further comprises:
partially suspending the USB device after each of one or more relevant packets of said data stream.

7. The method according to claim 1, wherein step (A) further comprises:
detecting a frame at a predetermined interval.

8. A computer readable medium configured to store instructions for executing the steps of claim 1.

9. An apparatus comprising:
a device including an oscillator having a start up time less than or equal to a predetermined time interval, said device configured to receive a data stream having frames comprising one or more indicators, wherein (i) said device is configured to operate in a suspend mode when relevant data is not present as determined in response to said one or more indicators, (ii) at least one of said one or more indicators comprise a frame marker or an external event and (iii) said oscillator has a startup time less than or equal to a predetermined time interval.

10. The apparatus according to claim 9, wherein at least one of said one or more indicators comprise a frame marker or an external event.

11. The apparatus according to claim 9, wherein said device is configured to enter said suspend mode after each of one or more relevant data packets at said data stream.

12. An apparatus comprising:
a device configured to receive a data stream having frames comprising one or more indicators, wherein said device is configured to operate in a suspend mode when relevant data is not present as determined in response to said one or more indicators;
an oscillator configured to clock said device;
a processor configured to control said device; and
a serial interface engine (SIE) configured to control said suspend mode of said device.

13. The apparatus according to claim 12, wherein said device is configured to continually return to said suspend mode.

14. The apparatus according to claim 12, wherein said oscillator has a start up time less than or equal to a predetermined time interval.

* * * * *